United States Patent
Feng et al.

(10) Patent No.: US 9,363,446 B2
(45) Date of Patent: Jun. 7, 2016

(54) AUTOMATIC EXPOSURE CONTROL FOR SEQUENTIAL IMAGES

(71) Applicant: HTC CORPORATION, Taoyuan, Taoyuan County (TW)

(72) Inventors: Wen-Chun Feng, Taoyuan (TW); Ya-Wen Huang, Taoyuan (TW); Fu-Chang Tseng, Taoyuan (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 0 days.

(21) Appl. No.: 14/252,383

(22) Filed: Apr. 14, 2014

(65) Prior Publication Data

US 2014/0307117 A1 Oct. 16, 2014

Related U.S. Application Data

(60) Provisional application No. 61/812,087, filed on Apr. 15, 2013.

(51) Int. Cl.
*H04N 5/235* (2006.01)

(52) U.S. Cl.
CPC ........... *H04N 5/2355* (2013.01); *H04N 5/2351* (2013.01)

(58) Field of Classification Search
CPC ... H04N 5/2355; H04N 5/2351; H04N 5/265; H04N 5/2353; H04N 5/235; H04N 5/2352; H04N 5/243; H04N 5/2328; H04N 5/23238
See application file for complete search history.

(56) References Cited

U.S. PATENT DOCUMENTS

| | | | | |
|---|---|---|---|---|
| 6,670,993 | B1* | 12/2003 | Yamamoto | H04N 5/238 348/362 |
| 2008/0231728 | A1* | 9/2008 | Asoma | G03B 7/093 348/229.1 |
| 2008/0266418 | A1* | 10/2008 | Imai | H04N 5/235 348/229.1 |
| 2010/0097493 | A1* | 4/2010 | Asoma | H04N 5/235 348/229.1 |
| 2012/0281111 | A1* | 11/2012 | Jo | H04N 5/217 348/229.1 |

* cited by examiner

*Primary Examiner* — Luong T Nguyen
(74) *Attorney, Agent, or Firm* — Muncy, Geissler, Olds & Lowe, P.C.

(57) ABSTRACT

An exposure control method and an image processing system are provided. The image processing system comprises: an image sensor module, configured to provide at least two types of source images in parallel, each type of the source images has different exposure setting; a pre-processing unit, configured to determine luminance distribution of the source images on block basis, perform a first exposure control according to the luminance distribution of the two types of source images, and generate output images according to the source images in RAW image domain, and a post-processing unit, configured to determine luminance distribution of the output images, and perform a second exposure control according to the luminance distribution of the output images in normal image domain; wherein exposure settings of the image sensor module is adjusted according to the first exposure control and the second exposure control.

16 Claims, 8 Drawing Sheets

| Image source 1 | | |
|---|---|---|
| Index | Gain | Line count |
| 0 | $G_{L0}$ | $T_{L0}$ |
| 1 | $G_{L1}$ | $T_{L1}$ |
| 2 | $G_{L2}$ | $T_{L2}$ |
| ... | ... | ... |
| ... | ... | ... |
| N | $G_{LN}$ | $T_{LN}$ |

| Image source 2 | | |
|---|---|---|
| Index | Gain | Line count |
| 0 | $G_{S0}$ | $T_{S0}$ |
| 1 | $G_{S1}$ | $T_{S1}$ |
| 2 | $G_{S2}$ | $T_{S2}$ |
| ... | ... | ... |
| ... | ... | ... |
| N | $G_{SN}$ | $T_{SN}$ |

AUTOMATIC EXPOSURE CONTROL FOR SEQUENTIAL IMAGES

This application claims priority to U.S. Provisional Patent Application No. 61/812,087 filed on Apr. 15, 2013, which is hereby incorporated by reference in its entirety.

CROSS-REFERENCES TO RELATED APPLICATIONS

Not applicable.

BACKGROUND OF THE INVENTION

1. Field of the Invention

The present invention relates to an image processing. More particularly, the present invention relates to an automatic exposure control for sequential images.

2. Descriptions of the Related Art

Image capture and processing functions are widely implemented in consumer electronic devices, such as digital camera, smart phone or tablet. Images are generally captured by an input module comprising image sensors and lens. The raw images thus captured are performed with various processing before being provided for display and/or storage. Some processing may be general for all types of image capture operations, including photo shooting or video recording, for example de-noise that removes defect pixels. Some may be specific for desired functions/effects. For example, high dynamic range (HDR) is performed to produce images covering wider brightness range by combining two or more images captured by different exposure settings. However, surrounding light conditions may vary by background changes or time and thus cause the dynamic range of brightness of the scene to change, the exposure settings initially applied for capturing images may not be suitable at later time. Conventional exposure control for HDR images are performed by analyzing preview images prior to actual capture, but such technique is not applicable to real time image capture because it would cause significant delay between images. Therefore, there exists need for improved exposure control of image processing, particularly for sequential images in real time, such as video recording.

SUMMARY OF THE INVENTION

The primary objective of this invention is to provide an exposure control method fir use in an electronic device. The exposure control method comprises: receiving at least a first set of source images generated from at least two image sources, the image sources having different exposure settings; generating a first composite image from the first set of source images; determining a luminance target according to luminance information of the first composite image; adjusting exposure settings of the image sources according to the luminance target; receiving at least a second set of source images from the image sources according to the adjusted exposure settings; dividing each of the second set of the source images into a plurality of blocks; determining luminance information corresponding to each of the plurality of block of each of the second set of the source images; and adjusting the exposure setting of the image sources according to corresponding luminance information of the plurality of blocks of corresponding source images.

Another objective of this invention is to provide an image processing system for performing exposure control of sequential images. The image processing system comprises: an image sensor module, configured to provide at least two types of source images in parallel, each type of the source images has different exposure setting; a pre-processing unit, configured to determine luminance distribution of the source images on block basis, perform a first exposure control according to the luminance distribution of the two types of source images, and generate output images according to the source images in RAW image domain, and a post-processing unit, configured to determine luminance distribution of the output images, and perform a second exposure control according to the luminance distribution of the output images in normal image domain; wherein exposure settings of the image sensor module is adjusted according to the first exposure control and the second exposure control.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The present disclosure proposes an automatic exposure control (AEC) method for adjusting exposure of sequential images such as real-time video. Preferably, the auto exposure control algorithm is applied to image source having multiple image outputs with different exposure values. The multiple image outputs may provide a final output with high dynamic range (HDR) effect for display and/or storage. In an embodiment of the present disclosure, the electronic device implementing the present disclosure may provide real-time HDR video with AEC.

Figure 1:
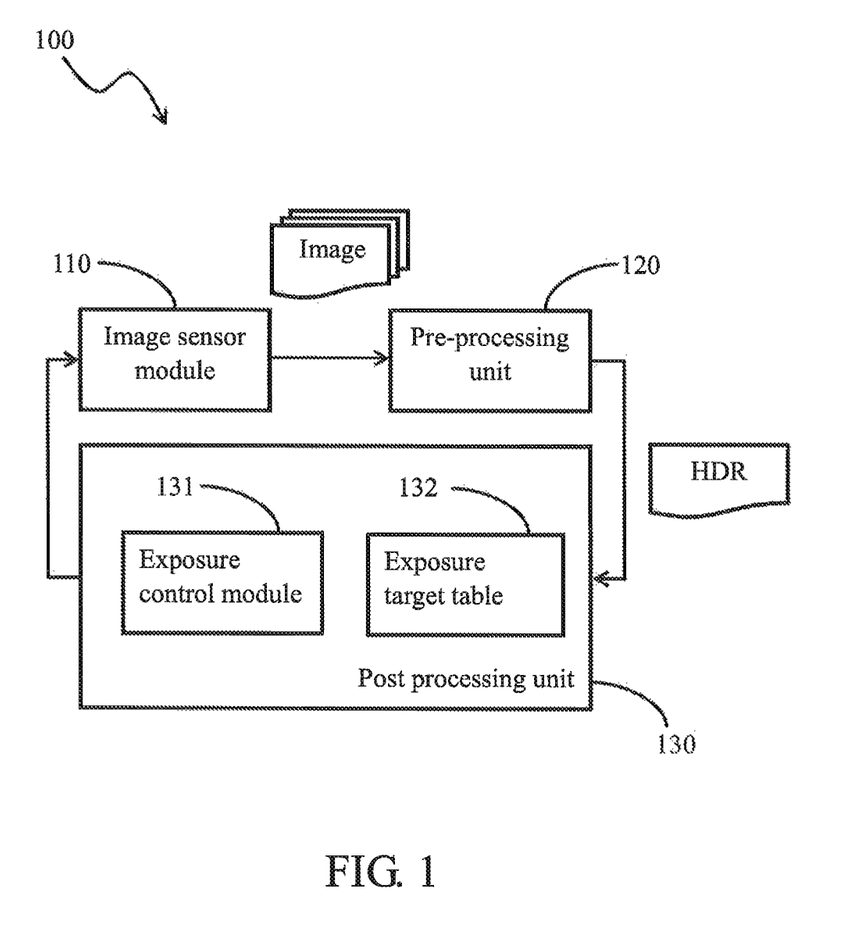
FIG. 1 is a block diagram of an image capture system of an embodiment of the present disclosure.

Please refer to FIG. 1, which illustrates a block diagram of an image capture system 100 of an embodiment of the present disclosure. The age capture system 100 comprises at least an image sensor module 110, a pre-processing unit 120, and a post-processing unit 130. The image sensor module 110 is capable to provide outputs of at least two types of source images concurrently, each of which acts as an image source. The source images may be captured by different settings, such as exposure setting. The exposure setting may comprise exposure gain and exposure time (or line count). For example, the image sensor module 110 may provide a source image of a first exposure together with another source image of a second exposure, in which the first exposure is larger than the second exposure. The exposure value ay be the multiplication of the exposure gain and the exposure time. The source images can be provided simultaneously, interleaved, or interlaced by lines. For example, a first exposure image is followed by a second exposure image and another first exposure image and so on. Or the source images may have a first exposure line next to a second exposure line, then another first exposure line and so on. In another embodiment, the source images are provided independently by multiple image sources, which may be multiple image sensor units. The combination of the source images can be varied depending on hardware capability and limitation in embodiments of the present disclosure. Please note that in the embodiments of the present disclosure, multiple image sources do not necessarily correspond to physically having multiple hardware modules for generating source images. Also in an embodiment of the present disclosure, the pre-processing unit 120 and the post processing unit 130 may be implemented as dedicated hardware circuits separately or be integrated in a single processor. For example, the pre-processing unit 120 and the post-processing unit 130 may be separate image processors or be two processing units within a single image processor. Furthermore, one of the pre-processing unit 120 and the post-processing unit 130 may be an image processor and the other may be a processing unit within another processor.

The source images, comprising at least first exposure images and second exposure images, are sent to the pre-processing unit 120 for generating composite images from the source images. Also note here again that the source images may comprise two or more images with different exposure values. In another embodiment, the source images comprise first exposure images, second exposure images and third exposure images. The source images from the image sensor module 110 are provided in raw image format, such as raw RGB format. The pre-processing unit 120 is configured to perform image processing in raw image domain, while the post-processing unit 130 is configured to perform image processing in normal image domain (converted from raw image domain), such as RGB, YUV or HSV domain. Furthermore, the pre-processing unit 120 is configured to perform a first exposure control on the source images respectively and the post-processing unit 130 is configured to perform a second exposure control on the composite images. Here in the present disclosure, the pre-processing unit 110 is capable to perform auto exposure control, auto focus control, image composition, etc. In an embodiment of the present disclosure, the pre-processing unit 110 is further configured to generate high dynamic range (HDR) images from the source images, and the HDR images can be provided as still images or motion images, i.e. camera photo or video stream. In another embodiment of the present disclosure, the pre-processing unit 120 may simply provide source images of the same exposure value only. The determination of providing single exposure output or multiple exposure output can be done by user or dynamically by the image capture system 100. In a first embodiment, HDR composition or other image composition can be selected via a user interface (not shown) of the image capture system 100. In another embodiment of the present disclosure, the image capture system 100 analyzes the source images and determines whether certain conditions are met for enabling HDR. The conditions may correspond to predetermined scene types, for example backlight or flicker. The pre-processing unit 120 may perform scene type analysis on the source images and provide single or composite images as output according to the scene type. The scene type analysis may be performed based on several characteristics depending on the types selected for determination, such as flicker, white balance, luminance distribution, etc. Once the scene type is determined, the pre-processing unit 120 then decides which source images should be used for generating output images. If the scene type suggests that HDR mode should be enabled, the pre-processing unit 120 would compose the first exposure source images and the second exposure images to provide composite HDR images to the post-processing unit 130. If the scene type suggests that normal mode should be enabled, the pre-processing unit 120 provides only the first exposure images or the second exposure images to the post-processing unit 130. In another embodiment, the pre-processing unit 120 provides both source images. However, the post-processing unit 130 may ignore the second exposure images or the first exposure images in normal mode. Please note that as described earlier, unlike conventional image system, the HDR composition is performed in raw image domain by the pre-processing unit 120.

The pre-processing unit 120 is further configured to perform a first exposure control on the source images as described above. The first exposure control may be performed according to luminance distribution of the source images. Particularly, the luminance distribution is determined for each of the first exposure source images and the second exposure images on block basis. Luminance distribution of the first exposure source images may be used to adjust exposure setting of the first image source that provides the first exposure source images. Similarly, luminance distribution of the second exposure source images may be used to adjust exposure setting of the second image source that provides the second exposure source images. Preferably, each of the source images is divided into a plurality of blocks, which may be divided into a predetermined number of blocks or be divided by predetermined size. In an embodiment of the present disclosure, assuming exposure of the first exposure source images is higher than that of the second exposure source images, exposure setting of the first image source is adjusted according to the luminance distribution of a first luminance range corresponding to low brightness part of the blocks. And exposure setting of the second image source is adjusted according to the luminance distribution of a second luminance range corresponding to high brightness part of the blocks. As understood by one with ordinary skill in the art, the low brightness part of the composite HDR image is contributed from corresponding part of the first exposure source image, and the high brightness part is contributed from corresponding part of the second exposure source image. To improve the image quality, the exposure of the first source image should be large enough to reveal low brightness part of the scene, and the exposure of the second source image should be limited so that the high brightness part of the scene is not over-exposed. To determine adjustment of exposure setting corresponding to each source image, block-voting mechanism is applied. For example, intensity of the first luminance range of each of the blocks may be compared with threshold intensity and thus exposure adjustment of each of the blocks of the first exposure source image, such as exposure time or gain, can be determined according to the difference between the corresponding luminance intensity and the threshold intensity. The overall adjustment corresponding to the source image is determined according to the exposure adjustments of the blocks. In embodiments of the present disclosure, the overall adjustment of the source image can be determined according to the average of exposure adjustments of blocks within the source image, or can be determined according to the exposure adjustments with maximum vote (i.e. maximum number of blocks). In another embodiment of the present disclosure, the overall adjustment can be determined by a weighted-average of the exposure adjustments, and the weighting may be assigned by the positions of the blocks within the source image. The overall adjustment of each source image can be then feedback to the image sensor module 110 from the pre-processing unit 120. Please note that in embodiments of the present disclosure, the first exposure control and the HDR image composition can be processed in parallel by the pre-pressing unit 120.

The post-processing unit 130 is configured to receive output images (i.e. composite HDR image or source images) in raw image domain from the pre-processing unit 120 and converts the output raw images into normal image domain, such as RGB for other processing and display purpose. In addition, the post-processing unit 130 is also configured to perform a second exposure control based on the output images. The output images may be composite HDR images or single source images depending on the scene type as described above. Among others, the post-processing unit 130 may comprise an exposure control module 131, an exposure target table 132. The exposure control module 131 is configured to determine luminance distribution of the output images and corresponding luminance values of the output images. The luminance value may be determined by weighted average of all pixels' luminance. The luminance value is compared with a target exposure value obtained from the exposure target table 132, in which the target exposure value is determined according to an image type of the composite image. In response to the difference of the luminance value and the target value satisfies predetermined conditions, the exposure settings of the image source are adjusted accordingly. The exposure control performed by the pre-processing unit 120 and the post-processing unit 130 will be described in further detail by following embodiments.

Figure 2:
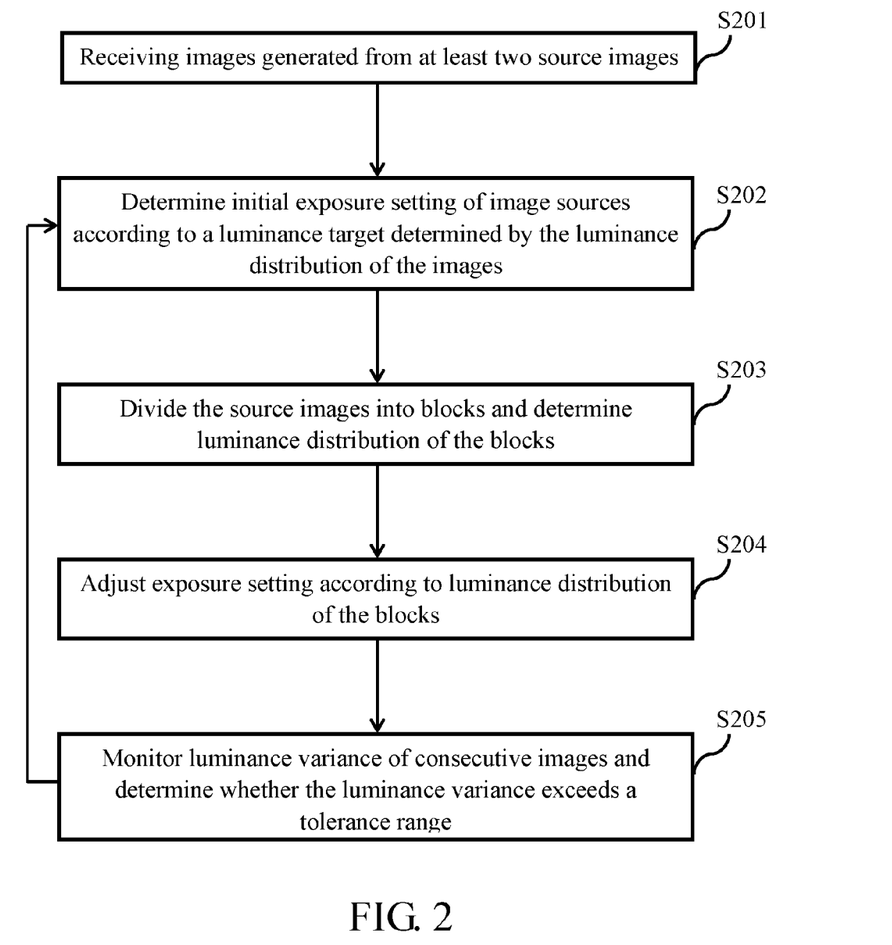
FIG. 2 illustrates an embodiment of auto exposure control method for sequential image capture with reference to FIG. 1.

To provide good HDR quality for video recording, exposure settings of the image sources of the image sensor module 110 should be dynamically adjusted according to the surrounding light conditions. As a result, the present disclosure discloses a novel approach for auto exposure control. FIG. 2 illustrates an embodiment of auto exposure control method for sequential image capture with reference to FIG. 1. The method starts receiving source images generated from at least two image sources in step S201. The source images are provided from image sources with different exposure settings, such as the image sensor module 110 of FIG. 1. Upon launch of the image capture system 100, the image sources (implemented within the image sensor module 110) start to provide source images to the pre-processing unit 120, and the pre-processing unit 120 may generate composite images from the source images. In step S202, the post-processing unit 130 may determine luminance distribution of the composite images, among other operations. Then initial exposure settings of the image sources are determined according to a luminance target. The luminance target is determined according to the image type of the received images. The image type can be determined by luminance distribution, object detection, face detection and/or other suitable algorithms. Image types may comprise landscape, portrait, low light, indoor, outdoor, etc. Each of the image type has its own desired luminance target. The luminance target is used as a luminance index for determining exposure settings. Luminance targets of different image types can be saved and checked. In the exposure target table 132. Please note that a statics calculation may be performed on the luminance histogram of at least one of the images for aiding determination of the image type. For example, a weighted-sum calculation of pixel amounts of all luminance values. The calculation result can be referenced as the luminance index for checking up the exposure target table 132 in an embodiment of the present disclosure. In another embodiment of the present disclosure, the luminance target table 132 may be maintained to specify the corresponding luminance target (used as luminance index) of a specified image type.

The exposure target table 132 comprises correspondence of each luminance index and corresponding exposure gain value and exposure time value, which in combination is the luminance target. The idea is that by analyzing the luminance distribution of output images, current light condition can be roughly determined and thus can be used to determine initial exposure settings accordingly. Please note that the luminance analysis can be performed specifically for one of the image source only for simplicity when the image type is unknown at the beginning, for example the first exposure image source with higher exposure. And by the result of the first exposure image source, the second image source can be set by predetermined offset. For example, the initial exposure setting of the second exposure image source can be set to 2 EV lower than the first exposure image source, with the same gain but different time. Alternatively, the exposure target table may correspond to the second exposure image source, and the first exposure image source is set by an offset to the second exposure image source, for example 2 EV higher with larger exposure gain. It should be understood that in the case that the image sources are more than two, any combination of the luminance distribution of the images can be applied for calculating the luminance targets of the image sources, such as the weighted-sum of pixels with respect to certain luminance regions. In another embodiment of the present disclosure, the luminance target can be determined according to the luminance distribution of the composite image, and be applied to one or both image sources.

The initial exposure settings are applied to respective image sources and the image sensor module 110 provides source images accordingly to the pre-processing unit 120. The pre-processing unit 120 may selectively output a composite image or single exposure image to the image processing unit according to the scene type, as described above. To adjust the exposure settings finely, both source images are analyzed respectively by the pre-processing unit 120. Furthermore, each source image is divided into a plurality of blocks and each block is analyzed by its luminance distribution in step 203. Based on the luminance distribution, it can be determined whether the exposure value of the corresponding block needs to be increased or decreased. Then the actual adjustment of the image sources is determined according to the combination of block adjustments of all blocks in corresponding source images in step S204. For example, the first image source is adjusted according to the luminance distribution of the first exposure source image. Alternatively, each image source may also reference the block luminance distributions of the source images of the other image source for determining the overall adjustment. Then the adjustment is applied to the image sensor module 110 for capturing following source images. And the pre-processing unit 120 provides output images to the post-processing unit 130, either single or composite images, according to the new exposure settings.

In addition, the post-processing unit 130 would monitor luminance variance of the composite output images in step S205. The purpose of monitoring luminance variance of the composite images is to detect changes of surrounding light condition. In response to the luminance variance of a current composite image to a reference luminance value exceeding a predetermined tolerance range, that means the light condition may be changed drastically and the image sensor module should change its settings accordingly. It is compared whether the luminance variance exceeding a tolerance range, for example 20%. The luminance of output images may be compared with a reference luminance value, such as luminance target of corresponding image type, luminance of the prior image with the same exposure setting captured in time order, etc. In response to the luminance variance exceeding the tolerance range, the process may flow back to reset exposure settings with respect to another exposure target determined by current exposure value. Also in another embodiment of the present disclosure, in response to the luminance variance suggests that the image type is changed from one to another, the initial luminance target for determining exposure settings should be adjusted. Accordingly, the process may flow back to reset exposure settings with respect another exposure target determined by the luminance target of the new image type to step S202.

Figure 3:
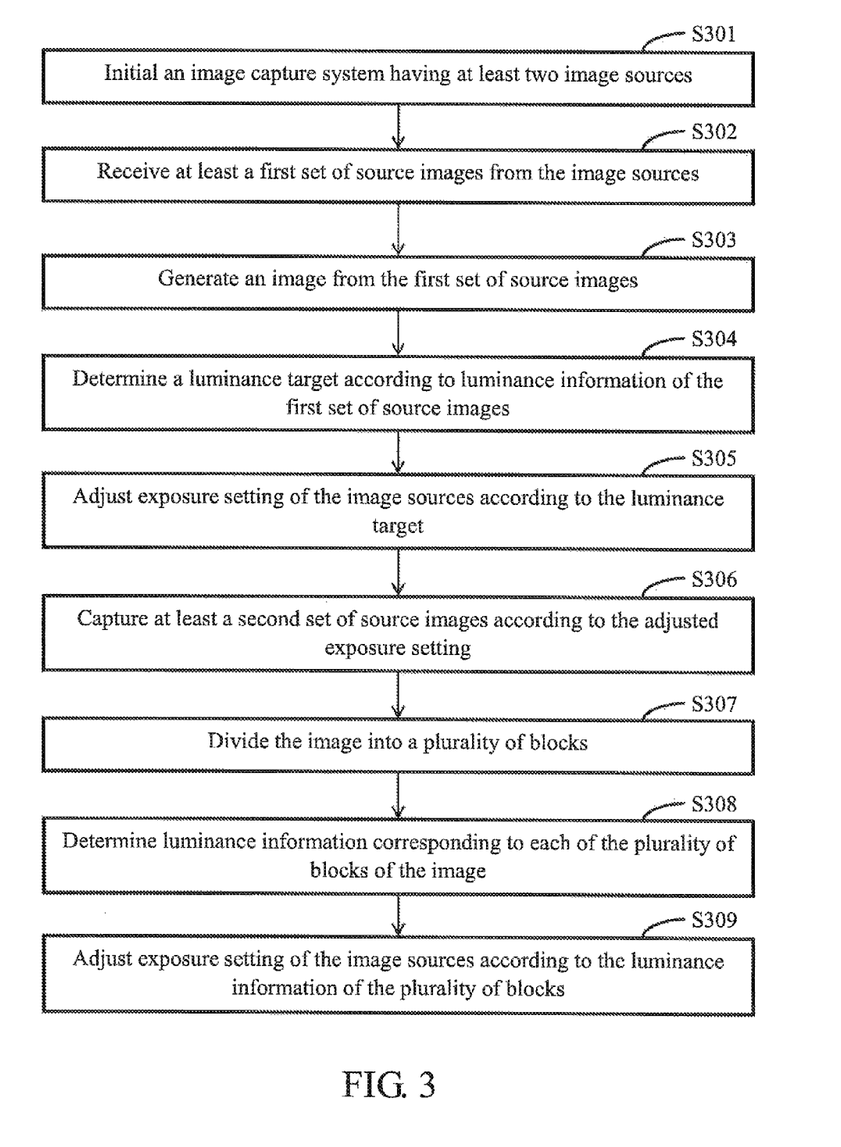
FIG. 3 illustrates another embodiment of exposure control method of the present disclosure.

FIG. 3 illustrates another embodiment of exposure control method of the present disclosure. Similar to the embodiment of FIG. 2, the embodiment of FIG. 3 is applied to image capture system having at least two image sources with different settings. The image capture system ay be an electronic device, such as mobile phone, tablet, digital camera, and/or others. The exposure control method starts with initialing the image capture system in step S301. The image capture system may load default settings or performing initialization for determining initial settings of exposure, focus, etc. Then at least a first set of source images from the images sources are received in step S302. The first set of source images comprises at least one image from each image source, and each one has different exposure value. The first set of source images are processed to obtain corresponding luminance information, for example luminance distribution, average luminance or weighted luminance of each source image. Prior to the derivation of the luminance information, the source images may be processed first to generate composite images in step S303, and the luminance calculation is performed on the composite images in another embodiment of the present disclosure. From the luminance information, an exposure target is determined in step S304. The exposure target corresponds to a target luminance value desired to achieve. In an embodiment of the present disclosure, the exposure target is determined by luminance information of the composite images, or one of the first set of source images, such as the source image of longest exposure value. Alternatively, the exposure target can be determined according to the source image of medium or shortest exposure. Please also note that the luminance can be calculated on partial region or pixels of the images, for example, luminance of a region of interest of the images or average luminance of pixels within a specific luminance range. The luminance can be used as an index for setting the exposure target. Correspondingly, in step S305 the exposure setting is adjusted according to the exposure target, comprising exposure gain and exposure time. In an embodiment of the present disclosure, the exposure target is applied for adjusting one of the image sources. For other image sources, exposure setting is adjusted by a predetermined offset to the determined adjustment. For example, the exposure target may correspond to the image source with higher exposure. Other image sources with lower exposure are adjusted with predetermined gain and/or time offset lower than the image source with higher exposure.

Once the exposure setting is adjusted accordingly, a second set of source images are captured with new settings in step S306. The second set of source images are used to generate an image that is provided as display output, for example an HDR image. To ensure previous exposure adjustment is applicable to the image generation, the source images are further processed. The source images are first divided into a plurality of blocks in step S307, in which can be predetermined by fixed number or by fixed size. In the previous adjustment, luminance information is obtained for the entire source image. In this step, finer details of small portions are revealed to provide further information. This is achieved by dividing the source images into blocks and determining luminance information corresponding to each of the blocks in step S308. Since some of the blocks may have higher luminance and some may have lower luminance, it can be known that the exposure of each block should be adjusted higher or lower individually. Then the exposure settings of the image sources are adjusted according to the luminance information of the plurality of blocks in step S309. In an embodiment of the present disclosure, the luminance information corresponds to pixels within certain luminance range. For example, the image source with higher exposure is adjusted according to luminance information corresponding to pixels below a first luminance threshold. The larger number of such pixels is for the blocks, the higher the exposure is adjusted to. Similarly, the image source of lower exposure is adjusted according to the luminance information corresponding to pixels above a second luminance threshold. To determine the overall adjustment, the plurality of blocks may be given different weights according to their importance in another embodiment. For example, blocks which are part of a main object are given higher weights while blocks of background Objects are given lower weights. The weighting can be determined in various ways depending on system requirement and/or user demand. Summarize from above, exposure setting is first adjusted according to the luminance distribution of composite images and fine-tuned again according to the luminance distribution of source images in the embodiment of FIG. 3.

Figure 4:
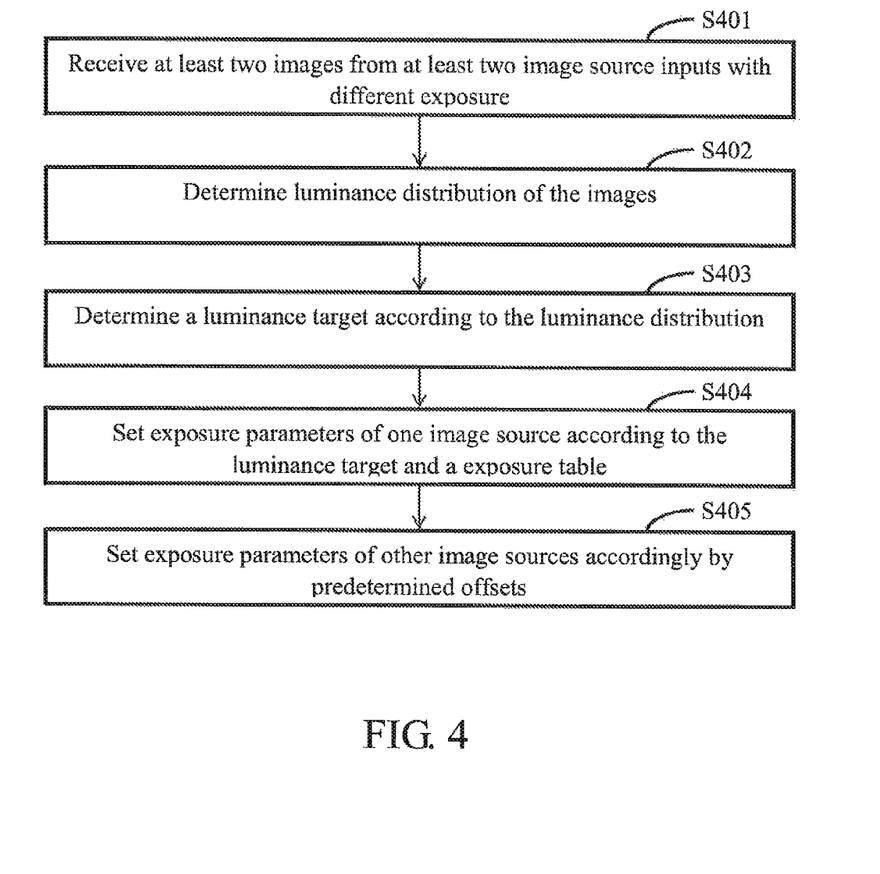
FIG. 4 depicts another embodiment of auto exposure control method of the present disclosure with reference to FIG. 5.
Figure 5:
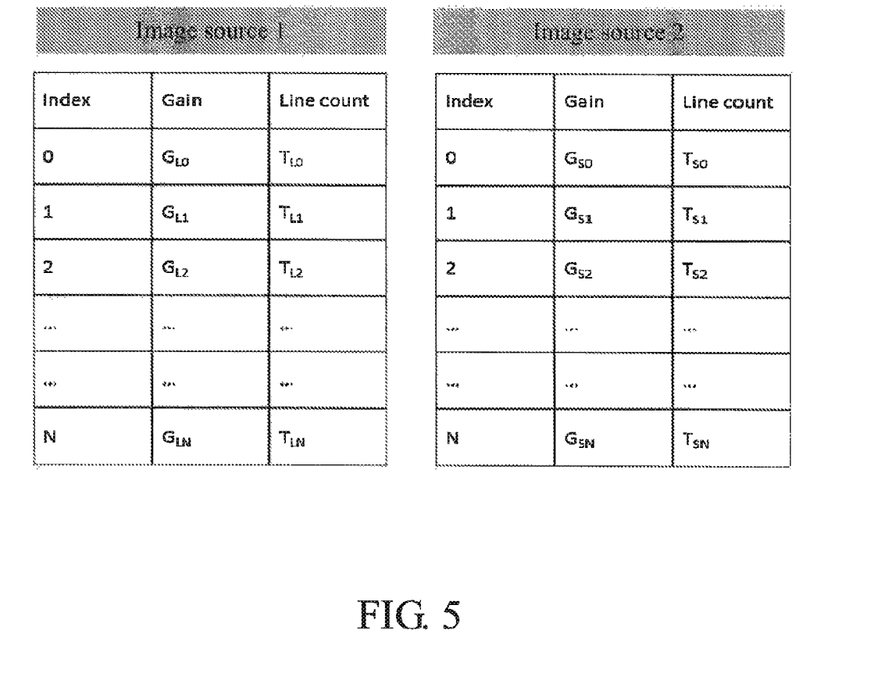
FIG. 5 is an example of an exposure table.

FIG. 4 depicts another embodiment of auto exposure control method of the present disclosure with reference to FIG. 5. In this embodiment, the image capture system comprises at least two image sources. The exposure settings of the image sources can be adjusted independently or with reference to another. First images generated from the image sources are received in step S401. The images may be images outputted from the image sources directly or composite images generated by combining source images from the image sources. Then the luminance distribution of the images is analyzed in step S402. In an embodiment of the present disclosure, the luminance distribution can be used to determine a representative luminance value of the ages, such as average luminance of overall pixels or partial pixels of partial regions. In another embodiment of the present disclosure, the representative luminance value is an average of a predetermined number of images (during a predetermined period of time), for example 10 images. Then a luminance target is determined according to the luminance value in step S403. In another embodiment of the present disclosure, the luminance distribution may be referenced for determining an image type, and thus to determine desired luminance value corresponding to the image type. The luminance target can be determined by determining the image type of the images according to the luminance distribution or be determined by referencing an exposure table using the representative luminance value as an index in step S404. An example of the exposure table is shown in FIG. 5, the luminance value is used as an index, and each index corresponds to exposure gain and exposure time. The exposure setting is applied to one of the image sources. For other image sources, the exposure setting is adjusted by a predetermined offset in step S405, for example increase or decrease the exposure time by predetermined units. In another embodiment of the present disclosure, the exposure table may also comprise settings of all image sources. As shown is FIG. 5, there may be multiple exposure tables for all image sources. The exposure value is calculated by multiplying gain value and time value, and the exposure variance between each index may be fixed.

Figure 6:
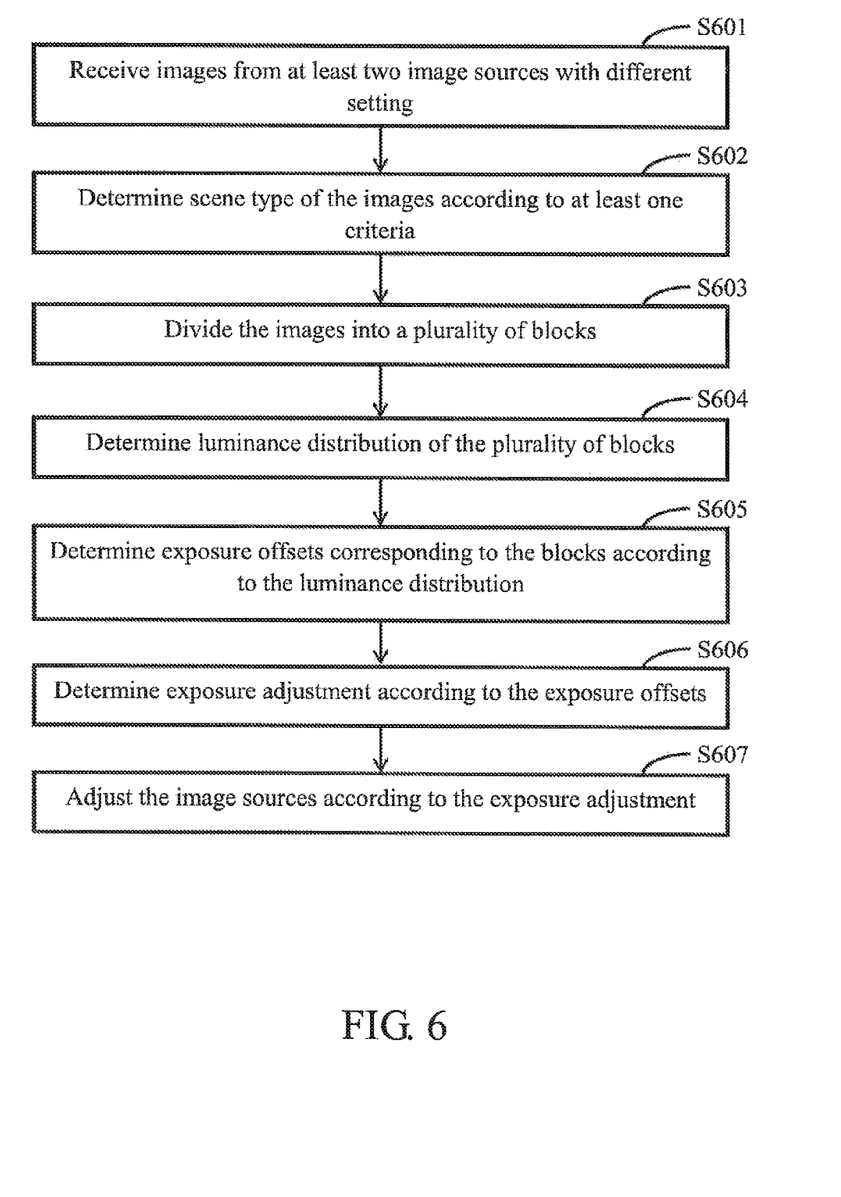
FIG. 6 illustrates another exposure control method of the present disclosure with reference to FIG. 7.
Figure 7:
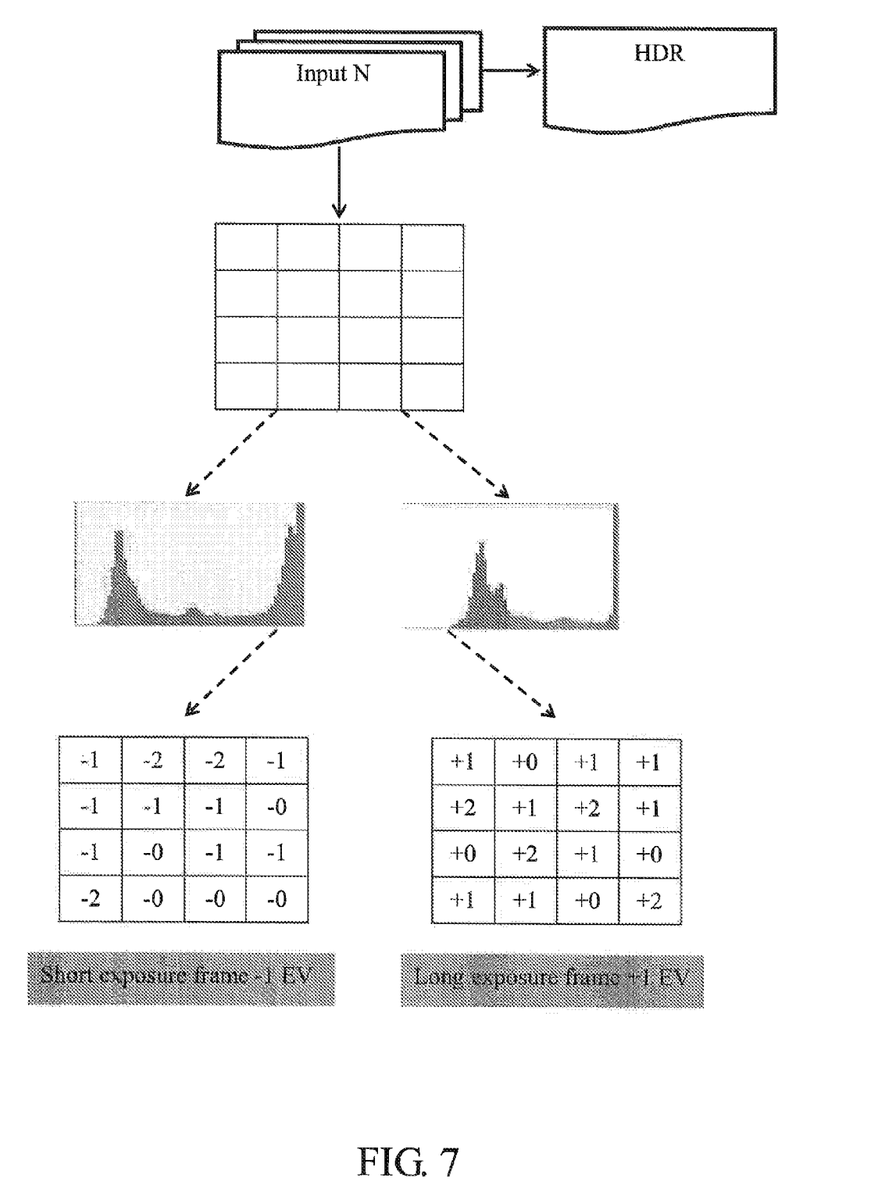
FIG. 7 is an example of an exposure control method.

FIG. 6 illustrates another exposure control method of the present disclosure with reference to FIG. 7, in this embodiment the output image is generated from two source images with different exposure values. Similarly to above embodiments, at least two images are received from at least two image sources with different exposure settings in step S601. Then the images are analyzed to determine a scene type of the scene taking according to at least one criteria in step S602. The criteria may be luminance distribution of the images and/or flicker condition. The determination can be made based on a selected source image (from the image source with specific exposure setting). According to the scene type, it is then determined whether to output composite image generated from multiple source images to provide an output image with better image quality, for example HDR image. For example, if it is determined that scene being taken now is in normal light condition or appearing flickers, the output image is contributed from single image source. However, if the scene is in a specific light condition such as backlight or outdoor, the output image is contributed by multiple image sources. Consequently, a composite image is generated from the source images according to the scene type. To ensure the initial settings of the image sources are capable to produce the output image of best quality, the source images are further analyzed. The images are first divided into a plurality of blocks in S603. It can be divided by predetermined block number or predetermined block size. Then luminance distributions of the plurality of blocks are determined in S604. As shown in the embodiment of FIG. 7, each id the source images is divided into 16 blocks and each block has its own luminance histogram. However, it should be noted other number of blocks can be divided in other embodiments of the present disclosure.

Next, the luminance histogram of each block is further divided into several regions, for example M, by predetermined threshold values. In the example of FIG. 7, the luminance histogram is divided into 8 regions in equal. Then the amount of pixels within specific region is calculated and a ratio between pixels in that region and overall pixels of the image is determined. Assume that there are two image sources, one provides first exposure images and the other provides second exposure images in which first exposure may be higher than second exposure or otherwise. The exposure setting of the exposure image source with higher exposure is adjusted according to the pixel amounts in low luminance region, for example below a first luminance threshold. On the contrary, the exposure setting of the exposure image source with lower exposure is adjusted according to the pixel amounts in high luminance region, for example above a second luminance threshold. As a result, there would be two ratio values, a first ratio corresponding to the high luminance region and used for adjusting the exposure image source with lower exposure, a second ratio corresponding to the low luminance region and used for adjusting the exposure image source with higher exposure. The ratios are then compared with corresponding threshold ratio for deciding whether the exposure gain and/or time should be increased or decreased. For the high luminance region of one single block, if the ratio is above a first threshold ratio (meaning that it might be too bright), then it is determined that for this block the luminance should be decreased with an exposure offset, i.e. lower exposure. For the low luminance region of one single block, if the ratio is above a second threshold ratio (meaning that it might be too dark), then it is determined that for this block the luminance should be increased with an exposure offset, i.e. lengthen the exposure. There may be several threshold ratios for determining what exposure offset should be adjusted to. As a result, there are M exposure offsets corresponding to the image sources. As shown in FIG. 7, illustrative tables of the exposure offsets are shown at bottom. The final exposure adjustment determined according to the exposure offsets in step S606. It can be determined by finding the average of the exposure offsets, selecting the exposure offset with most counts. Then the image sources are adjusted according to the exposure adjustment calculated from corresponding exposure offsets of corresponding luminance regions in step S607. Please note that the auto exposure control method can be implemented in the pre-processing unit 120 of FIG. 1 in RAW image domain prior to the source images are processed to generate output images.

Please note that, in an embodiment of the present disclosure, the exposure gain is adjusted according to the luminance distribution of source images only in RAW image domain. Furthermore, the low exposure image source is adjusted according to the adjustment result of high exposure source image, and the exposure gain is maintained the same as the high exposure image source in the exposure control performed on the composite HDR images. For example, the exposure time of low exposure image source is set as N-lines shorter than the high exposure image source so that the exposure difference of the two image source is M EV (assuming the exposure different of each exposure line is M/N EV). In the processing of source images, the exposure gain and/or time of the two image sources may be adjusted independently depending on corresponding partial luminance distributions of the blocks of the source image. However, the maximum exposure difference of the two image sources should not be too large. A difference threshold would be set to ensure the exposure difference of the image sources is limited. If the exposure difference of the two image sources exceeds the difference threshold, the adjusting amount can be equally distributed to the image sources, or reducing the adjustment of which having larger amount.

Figure 8:
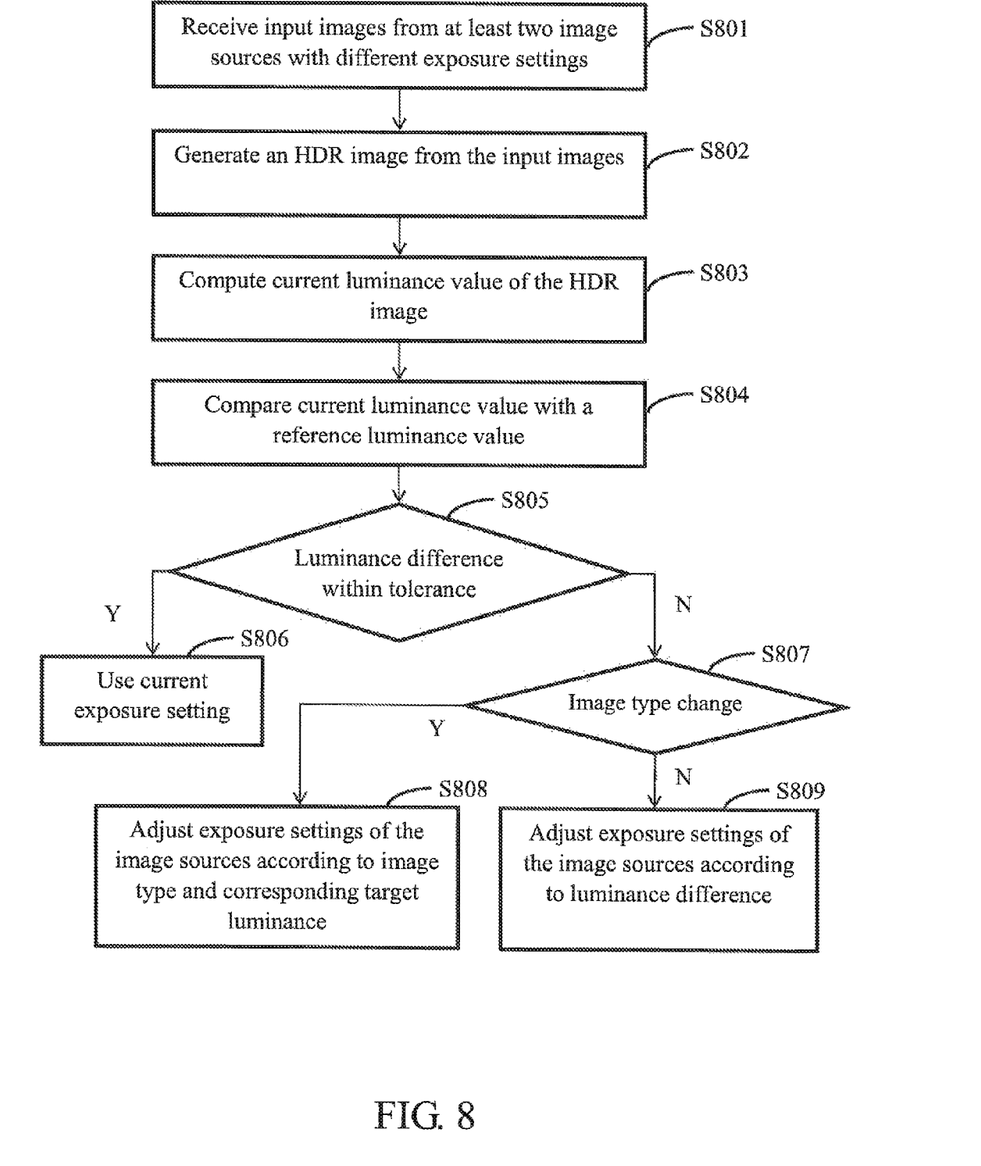
FIG. 8 illustrates an embodiment of auto exposure control method of the present disclosure.

FIG. 8 illustrates an embodiment of auto exposure control method of the present disclosure. The method starts with receiving input images from at least two image sources with different exposure settings in step S801. The image sources may be implemented independently or be integrated as a single hardware. The two image sources may provide source images in a constant rate. The input images are used to generate HDR images in real time. An HDR image is generated upon a pair of input images are received in step S802. As a result the HDR images can b crated in a constant rate as well. For example, an HDR video can be thus displayed and/or recorded by a user. Then current luminance value of the HDR image is calculated in step S803 and compared with a target luminance value in step S804. The current luminance value can be calculated as the average luminance value of all pixels of the HDR image or the average weighted-sum. The luminance difference of the current luminance value and the target luminance is calculated and determined whether it is within a tolerance range in step S805, for example 10% of the reference luminance value. If yes, current exposure settings of the image sources are still applied in step S806. If no, this indicates the surrounding light condition might have changed in step S807 and the exposure settings should be adjusted. In this case, the image type is checked to see if it is changed as well. If yes, the target luminance is reset according to the new image type in step S808. Then exposure settings of the image sources are adjusted according to the new target luminance and a luminance table. The target luminance may be used as an index and the luminance table comprises exposure gain and exposure time combination of the image sources corresponding to each index. The new setting is then applied to the image sources for capturing following input images. Again the process loops back and luminance value of following images are compared with the new luminance target. In response to the luminance difference exceeding tolerate but the image type does not change, the exposure settings are adjusted according to the luminance difference so that the current luminance would get closer to the luminance target in step S809. By utilizing this method, the exposure settings of image sources can be dynamically adjusting during the recording of HDR video.

Please note that each of the embodiments disclosed above may be implemented independently or in combination for achieving auto exposure control. Processing steps of the embodiments may be implemented by hardware, software, firmware or their combination. It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims. The above disclosure is related to the detailed technical contents and inventive features thereof.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An exposure control method for use in an electronic device, comprising:
   receiving at least a first set of source images generated from at least two image sources, the at least two image sources having different exposure settings;
   generating a first composite image from the first set of source images;
   determining a luminance target according to a luminance information of the first composite image;
   adjusting exposure settings of the at least two image sources according to the luminance target;
   receiving at least a second set of source images from the at least two image sources according to the adjusted exposure settings;
   dividing each of the second set of the source images into a plurality of blocks;
   determining luminance information corresponding to each of the plurality of block of each of the second set of the source images; and
   adjusting the exposure setting of the at least two image sources according to the luminance information of the plurality of blocks of the second set of the source images.

2. The exposure control method of claim 1, wherein the determining of the luminance target comprises:
   determining luminance distribution of the first composite image;
   determining a luminance index corresponding to the first composite image according to the luminance distribution; and
   determining the luminance target according to the luminance index and a luminance target table.

3. The exposure control method of claim 1, wherein the adjusting of the exposure setting of the at least two image sources according to the luminance target comprises:
   determining exposure setting of one of the image source according to the luminance target; and
   adjusting the exposure setting of the other image source according to an offset and the determined exposure setting.

4. The exposure control method of claim 1, for each of the at least two image sources, where the adjusting the exposure setting of the at least two image sources according to the luminance information of the plurality of blocks of the second set of source images comprises:
   determining exposure adjustment of each of the plurality of blocks according to the luminance information; and
   determining overall exposure adjustment of each of the second set of source images according to the exposure adjustments of the plurality of blocks.

5. The exposure control method of claim 4, wherein the overall exposure adjustment is determined by performing weighted average of the exposure adjustments of the plurality of blocks.

6. The exposure control method of claim 1, wherein the adjusting of exposure settings of the at least two image sources according to the luminance target is performed in normal image domain, and wherein the adjusting of the exposure setting of the at least two image sources according to the luminance information of the plurality of blocks of the second set of source images in RAW image domain.

7. An image processing system for performing exposure control of sequential images, comprising:
   an image sensor module, configured to provide at least two types of source images simultaneously, interleaved, or interlaced by lines, each type of the at least two types of source images has different exposure setting;
   a pre-processing image processor, configured to determine luminance distribution of the at least two types of source images on block basis, perform a first exposure control according to the luminance distribution of the at least two types of source images, and generate output images according to the at least two types of source images in RAW image domain, and
   a post-processing image processor, configured to determine luminance distribution of the output images, and perform a second exposure control according to the luminance distribution of the output images in normal image domain;
   wherein exposure settings of the image sensor module is adjusted according to the first exposure control and the second exposure control.

8. The image processing system of claim 7, wherein the pre-processing image processor is further configured to perform the first exposure control by dividing the at least two types of source images into a plurality of blocks, determining luminance distribution of each of the plurality of blocks, and determining exposure adjustment of each of the plurality of blocks according to the luminance distribution.

9. The image processing system of claim 8, wherein the pre-processing image processor is further configured to determine a first exposure adjustment for each type of the at least two types of source images by weighted average of the exposure adjustment of the plurality of blocks.

10. The image processing system of claim 8, wherein the exposure adjustments of the plurality of blocks of a first type of the at least two types of source images are determined according to intensity of a first range of the luminance distribution of the plurality of blocks and a first reference threshold, and the exposure adjustments of the plurality of blocks of a second type of the at least two types of source images are determined according to intensity of a second range of the luminance distribution of the plurality of blocks and a second reference threshold.

11. The image processing system of claim 7, wherein the post-processing image processor is configured to perform the second exposure control by determining luminance values of the output images, comparing the luminance values of the output images with a luminance target value, and determining a second exposure adjustment for at least a first type of the at least two types of source images according to the difference of the luminance values and the luminance target value.

12. The image processing system of claim 11, wherein the second exposure adjustment of a second type of the source image is determined according to an offset and the second exposure adjustment of the first type of the at least two types of source images.

13. The image processing system of claim 11, wherein the luminance target is determined according to an image type of the output images.

14. The image processing system of claim 7, wherein the post-processing image processor is further configured to monitor a difference of the luminance values of the output images with a reference luminance value.

15. The image processing system of claim 14, wherein in response to the difference of the luminance values and the reference luminance value exceeding a tolerance threshold, the post-processing image processor is further configured to determine whether an image type of the output images is changed; and wherein in response to the image type being changed, the exposure settings of the at least two types of source images are adjusted according to the changed image type, and wherein in response to the image type being unchanged, the exposure setting of the at least two types of source images are adjusted according to the difference of the luminance value and the reference luminance value.

16. The image processing system of claim 7, wherein the pre-processing image processor is further configured to generate composite HDR images from the at least two types of source images as output images in real time.

* * * * *